United States Patent
Yoon et al.

(10) Patent No.: US 11,297,998 B2
(45) Date of Patent: Apr. 12, 2022

(54) DISHWASHER

(71) Applicant: LG Electronics Inc., Seoul (KR)

(72) Inventors: Sangheon Yoon, Seoul (KR); Daegyu Kim, Seoul (KR)

(73) Assignee: LG Electronics Inc., Seoul (KR)

(*) Notice: Subject to any disclaimer, the term of this patent is extended or adjusted under 35 U.S.C. 154(b) by 337 days.

(21) Appl. No.: 16/271,357

(22) Filed: Feb. 8, 2019

(65) Prior Publication Data

US 2019/0239717 A1  Aug. 8, 2019

(30) Foreign Application Priority Data

Feb. 8, 2018  (KR) .................. 10-2018-0015782

(51) Int. Cl.
*A47L 15/48* (2006.01)
*A47L 15/42* (2006.01)

(52) U.S. Cl.
CPC .......... *A47L 15/488* (2013.01); *A47L 15/483* (2013.01); *A47L 15/486* (2013.01); *A47L 15/4221* (2013.01); *A47L 2501/10* (2013.01); *A47L 2501/11* (2013.01)

(58) Field of Classification Search
CPC .... A47L 15/486; A47L 15/488; A47L 15/483; A47L 2501/11; A47L 2501/10; A47L 15/4221; A47L 2501/12
See application file for complete search history.

(56) References Cited

U.S. PATENT DOCUMENTS

| 4,709,488 | A | | 12/1987 | Anselmino et al. |
| 5,337,500 | A | * | 8/1994 | Enokizono ............ A47L 15/486 34/225 |
| 5,355,900 | A | * | 10/1994 | Sakata .................. A47L 15/486 134/107 |
| 8,496,760 | B2 | * | 7/2013 | Bertsch ................. A47L 15/483 134/18 |
| 2003/0140517 | A1 | * | 7/2003 | Schmid ............... A47L 15/0034 34/78 |
| 2007/0157954 | A1 | * | 7/2007 | Classen ................. A47L 15/481 134/56 D |

(Continued)

FOREIGN PATENT DOCUMENTS

| CN | 202128428 | 2/2012 |
| CN | 104083136 | 1/2017 |

(Continued)

OTHER PUBLICATIONS

Extended European Search Report in European Application No. 19156105.9, dated Jul. 16, 2019, 8 pages.

*Primary Examiner* — Benjamin L Osterhout
(74) *Attorney, Agent, or Firm* — Fish & Richardson P.C.

(57) ABSTRACT

A dishwasher includes: a cabinet defining an external appearance of the dishwasher; a tub disposed in the cabinet to form a space where to wash dishes, and having an exhaust hole formed on an upper surface of the tub; and an external air flow unit forming a flow path, along which external air is introduced and discharged, and having an inflow hole formed above the exhaust hole to communicate with the tub, wherein the external air flow unit takes a shape in which a cross-sectional area of the flow path decreases in an upstream side of the inflow hole in a flow direction of the external air and increases in a downstream side of the inflow hole.

20 Claims, 6 Drawing Sheets

(56) References Cited

U.S. PATENT DOCUMENTS

| | | | |
|---|---|---|---|
| 2008/0006308 A1* | 1/2008 | Classen | A47L 15/483 134/95.2 |
| 2008/0087307 A1* | 4/2008 | Han | A47L 15/4257 134/104.4 |
| 2008/0264455 A1 | 10/2008 | Brewer et al. | |
| 2008/0283099 A1* | 11/2008 | Peukert | A47L 15/488 134/99.1 |
| 2009/0095332 A1* | 4/2009 | Lee | A47L 15/486 134/105 |
| 2013/0008474 A1* | 1/2013 | Thayyullathil | A47L 15/488 134/95.2 |
| 2013/0152981 A1* | 6/2013 | Bertsch | A47L 15/0013 134/105 |
| 2016/0143507 A1 | 5/2016 | Tuller | |
| 2017/0319045 A1* | 11/2017 | Wu | A47L 15/4257 |

FOREIGN PATENT DOCUMENTS

| | | |
|---|---|---|
| DE | 29621351 | 2/1997 |
| DE | 19704430 | 8/1998 |

* cited by examiner

FIG. 8

DISHWASHER

CROSS-REFERENCE TO RELATED APPLICATION

This application claims the priority benefit of Korean Patent Application No. 10-2018-0015782, filed on Feb. 8, 2018 in the Korean Intellectual Property Office, the disclosure of which is incorporated herein by reference.

FIELD

The present disclosure relates to a dishwasher and, more particularly, to a dishwasher provided with an apparatus for drying an inner space of a tub.

BACKGROUND

A dishwasher is an apparatus that washes dishes using water and detergent through washing, rinsing, and drying courses in a space where the dishes are held. With the washing and rinsing courses using water and detergent, food remains or other foreign substances can be removed from the dishes. In addition, the dishes can be completely washed with the drying course in which moisture remaining in the dishes are removed.

The drying course of the dishwasher may be performed by increasing temperature of water to be sprayed toward dishes to facilitate evaporation of moisture on the dishes and increasing temperature of evaporated moisture evaporated moisture to be condensed in a cooling duct provided inside or outside of a wash tank or to be absorbed by an absorbent.

In the case of discharging humid air in a tub to the outside, it is possible to quickly dry dishes in the dishwasher but this may lead to mold to grow around the dishwasher due to a great amount of discharged humid air or damage outer components of the dishwasher.

Korean Patent Application No. 10-2015-0168759 discloses an air blower provided on the top of a tub, the air blower which spray out air jet. Since the air blower opens a door to discharge humid vapor and the air get from the tub, and there is a problem that an excessive amount of humid vapor may be discharged from the tub.

SUMMARY

The first object of the present disclosure is to provide a dishwasher that discharges humid vapor from a tub to an outside of the dishwasher in a dry state.

The second object of the present disclosure is to provide a dishwasher that condenses part of humid vapor in the tub to thereby reduce humidity in the tub.

The third object of the present disclosure is to provide a dishwasher that prevents wash water, sprayed from the tub through a hole formed on an upper side of the tub, from flowing into an external air flow unit.

The technical objects of the present disclosure are not limited to the aforementioned objects, and other unmentioned objects will be apparent to a person having ordinary skill in the art from the following description.

In order to achieve the first objective, the present disclosure provides a dishwasher including: a cabinet defining an external appearance of the dishwasher; a tub disposed in the cabinet to form a space where to wash dishes, and having an exhaust hole formed on an upper surface of the tub; and an external air flow unit forming a flow path, along which external air is introduced and discharged, and having an inflow hole formed above the exhaust hole to communicate with the tub, wherein the external air flow unit takes a shape in which a cross-sectional area of the flow path decreases in an upstream side of the inflow hole in a flow direction of the external air and increases in a downstream side of the inflow hole. Accordingly, humid vapor in the tub may be suctioned into the external air flow unit, mixed with external air flowing in the external air flow unit, and discharged to an outside in a low-temperature humid state.

In order to achieve the second objective, the external air flow unit in the dishwasher according to the present disclosure may include: an external air inflow part disposed below the tub and having a flow fan which operates to introduce the external air; a heat exchanger communicating with the external air inflow part and disposed in surface contact with a side surface of the tub; and an external air discharge part communicating with the heat exchanger and disposed on an upper side of the tub to mix air introduced from the heat exchanger with air introduced from the tub and discharges the mixed air to an outside. Accordingly, the heat exchanger may exchange heat of internal air of the tub with external air through one side surface of the tub to thereby condense air flowing in the tub.

In order to achieve the first objective, in the heat exchanger of the dishwasher according to the present disclosure, a cross-sectional area of the flow path may be decreased at a discharge end of the heat exchanger, and the decreased cross-sectional area is maintained from an inflow end of the external air discharge part to the inflow hole of the external air inflow unit. Accordingly, the external air flow unit may form negative pressure at a portion where the inflow hole is formed.

In order to achieve the first objective, the heat exchanger of the dishwasher according to the present disclosure may include: an expanding tubular portion which is disposed in a lower side, and in which a cross-sectional area of the flow path is increased; a maintaining tubular portion which is disposed above the expanding tubular portion, and in which the cross-sectional area of the flow path, increased in the expanding tubular portion, is maintained; and a narrowing tubular portion which is disposed above the maintaining tubular portion, and in which the cross-sectional area of the flow path is decreased, and the cross-sectional area of the flow path, decreased in the narrowing tubular portion, is maintained at an inflow end of the external air discharge part. Accordingly, the external air flow unit may form negative pressure at a portion where the inflow hole is formed.

In order to achieve the first objective, the external air flow unit of the dishwasher according to the present disclosure may further include: a connecting tube that connects the heat exchanger disposed on a side surface of the tub and the external air discharge part disposed on the upper side of the tub, and the connecting tube may maintain the cross-sectional area of the flow path which has been decreased in the narrowing tubular portion. Accordingly, the external air flow unit may form negative pressure at a portion where the inflow hole is formed.

In order to achieve the second objective, the heat exchanger of the dishwasher according to the present disclosure may include: a heat exchange chamber disposed in surface contact with a side surface of the tub to form a space in which air flows; and a flow path guide for guiding a flow of air in the heat exchange chamber. Accordingly, heat exchange between the tub and the heat exchanger may occur in a wide area.

In order to achieve the third objective, the dishwasher according to the present disclosure may further include a cap that connects the tub and the external air flow unit to enable the exhaust hole and the inflow hole to communicate with each other, and to cover wash water sprayed from the tub. Accordingly, the tub and the external air flow unit may be connected to each other while wash water sprayed in the tub is prevented from the external air flow unit.

In order to achieve the third objective, the cap may guide air exhausted from the tub and cover wash water sprayed from the tub. Accordingly, wash water sprayed in the tub may be prevented from flowing into the external air flow unit.

In order to achieve the third objective, the cap may include: a first cover disposed below a center of the cap and having a circular plate shape; a second cover disposed on a circumference of the first cover to extend upward and inclined toward the center of the cap; and a third cover disposed on a circumference of the second cover to extend upward and bent toward the center of the cap. Accordingly, wash water sprayed in the tub may be prevented from flowing into the external air flow unit.

In addition, the cap may further include a connecting rib, which radially extends from the center of the cap and connects the first cover, the second cover, and the third cover. Accordingly, rigidity of the cap may be reinforced.

The details of other embodiments are included in the following description and the accompanying drawings.

The dishwasher of the present disclosure has one or more effects as below.

First, humid vapor in the tub is mixed with external air flowing in the external air flow unit due to a shape of a flow path of the external air flow unit, which is formed around the exhaust hole of the tub, and accordingly, there is an advantage in discharging humid air of low temperature to the outside of the dishwasher.

Second, as the heat exchanger in which external air flows is disposed on one side surface of the tub, humid air in the tub is partially condensed through heat exchange with the heat exchanger, and accordingly, there is an advantage in enhancing drying performance.

Third, as a cap provided with a plurality of covers is disposed at the exhaust hole through which humid vapor is discharged from the tub, there is an advantage in preventing wash water, sprayed from the tub upon operation of a spray nozzle, from flowing into the external air flow unit.

Objects of the present disclosure should not be limited to the aforementioned objects and other unmentioned objects will be clearly understood by those skilled in the art from the following description.

BRIEF DESCRIPTION OF THE DRAWINGS

The embodiments will be described in detail with reference to the following drawings in which like reference numerals refer to like elements wherein.

DETAILED DESCRIPTION

Advantages and features of the present disclosure and a method of achieving the same will be clearly understood from embodiments described below in detail with reference to the accompanying drawings. However, the present disclosure is not limited to the following embodiments and may be implemented in various different forms. The embodiments are provided merely for complete disclosure of the present disclosure and to fully convey the scope of the disclosure to those of ordinary skill in the art to which the present disclosure pertains. The present disclosure is defined only by the scope of the claims. In the drawings, the thickness of layers and regions may be exaggerated for clarity. Throughout the drawings, like numbers refer to like elements.

Hereinafter, a dishwasher according to embodiments of the present disclosure will be described with reference to the accompanying drawings.

<Configuration of Dishwasher>

Figure 1:
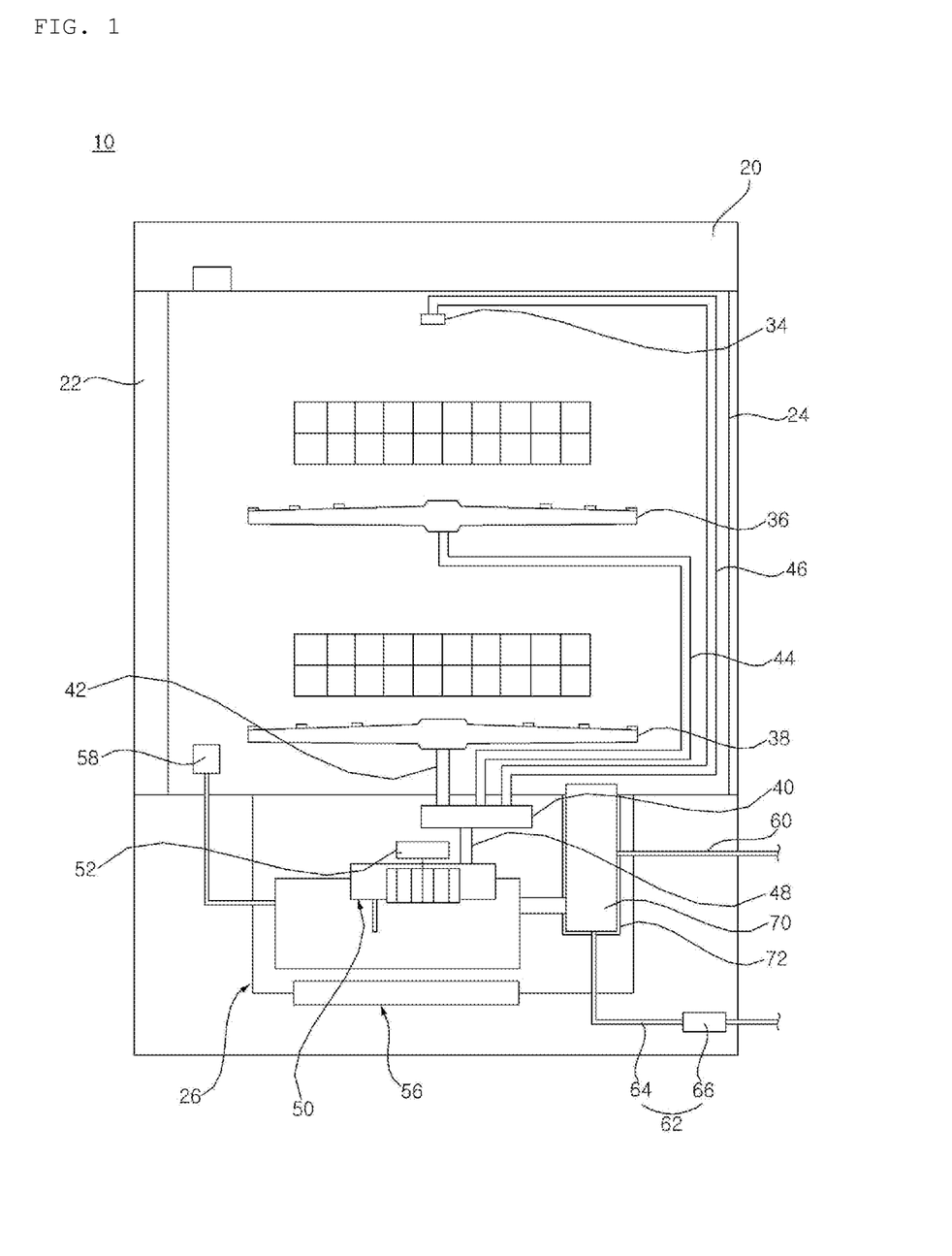
FIG. 1 is a schematic front cross-sectional view of a dishwasher according to an embodiment of the present disclosure.

FIG. 1 is a schematic front cross-sectional view of a dishwasher according to an embodiment of the present disclosure.

Referring to FIG. 1, a dishwasher 10 according to the present embodiment includes a cabinet 20 defining an external appearance of the dishwasher 10, a door 22 coupled to the cabinet 20 to open and close the inside of the cabinet 20, and a tub 24 installed in the cabinet 20 to handle dishes positioned in the tub 24. The cabinet 20 and the tub 24 are in a structure having an opened front surface on which the door 22 is disposed.

The dishwasher 10 according to the present embodiment may include a dispenser (not shown) for storing detergent introduced by a user and introducing the detergent into the tub 24 in a washing step. The dispenser may be disposed in the door 22.

The cabinet 20 according to the present embodiment may define an external appearance of the dishwasher 10, and one side of the cabinet 20 may be opened. An external air inflow hole 122, through which air is introduced into an external air inflow part 110, may be formed on one side of the cabinet 20 according to the present embodiment. In addition, an external air exhaust port (not shown) through which heat-exchanged external air is exhausted may be formed on the other side of the cabinet 20.

In order to wash dishes, the tub 24 forms a space where the dishes are to be placed. The tub 24 according to the present embodiment may have an air guide hole (not shown) on one side thereof to discharge air to the outside when pressure in the tub increase, thereby reducing the pressure.

The tub according to the present embodiment is disposed in the cabinet 20. The tub 24 according to the present embodiment may form a space in which an external air flow unit 100, which will be described later, is disposed. An exhaust hole 25a for allowing air in the tub to flow into the external air flow unit 100 may be formed on an upper surface of the tub 24 according to the present embodiment.

The dishwasher 10 according to the present embodiment includes: a rack 30 and 32 for accommodating dishes in the tub 24, a spray module for spraying wash water toward dishes accommodated in the rack 30 and 32; a sump 26 for supplying the wash water to the spray module; and a wash pump 50 for pumping the wash water stored in the sump 26.

The spray module serves to spray wash water toward dishes. The spray module includes: a spray nozzle 34, 36, and 38; and a supply pipe 42, 44, and 46 which connects the wash pump 50 and the spray nozzle 34, 36, and 38.

The dishwasher 10 further includes a wash motor 52 which drives the wash pump 50, and the wash motor 52 may be implemented as a Brushless Direct Current (BLDC) motor of which the number of rotations is controllable. Since the wash motor 52 is a BLDC motor, it is possible to set a target revolution per minute (RPM). If the rpm of the BLDC motor changes, a transfer force of the wash pump 50 changes.

The dishwasher 10 according to the present embodiment may further include: a water supply module 60 for supplying water to the sump 26 or the spray module; a drain module 62 connected to the sump 26 to discharge wash water to the outside; a filter module 70 installed in the sump 26 to filter the wash water; and a wash water heating module 56 installed in the sump 26 to heat the wash water.

The rack 30 and 32 for accommodating subjects to wash, such as dishes, are provided in the tub 24. The dishwasher 10 according to the present embodiment may include at least one rack 30 and 32. The rack 30 and 32 according to the present embodiment includes a lower rack 32 disposed in a low side of the tub 24, and an upper rack 30 disposed above the lower rack 32.

The dishwasher 10 according to the present embodiment may include at least one spray nozzles 34, 36, and 38. The dishwasher 10 according to the present embodiment includes: a lower nozzle 38 disposed in the tub 24 to wash a subject to wash accommodated in the lower rack 32; an upper nozzle 36 for washing a subject to wash accommodated in the upper rack 30; and a top nozzle 34 disposed in the highest point on the tub 24 to spray wash water.

The supply pipe 42, 44, and 46 according to the present embodiment connects the sump 26 and the spray nozzle 34, 36, and 38. If the wash pump 50 operates to pump wash water stored in the sump 26, the wash water is supplied to the spray nozzle 34, 36, and 38. The supply pipe 42, 44, and 46 according to the present embodiment includes: a first pipe 42 through which wash water is supplied to the lower nozzle 38; a second pipe 44 through which wash water is supplied to the upper nozzle 36; and a third pipe 46 through which wash water is supplied to the top nozzle 34.

The dishwasher 10 according to the present embodiment includes a flow path switching part 40 for supplying wash water stored in the sump 26 to the first pipe 42, the second pipe 44, and the third pipe 46.

to the present embodiment includes a flow path switching motor (not shown) which generates a rotational force, and a rotary plate which rotates by the flow path switching motor to adjust a flow of wash water. The rotary plate according to the present embodiment may selectively open and close a plurality of connection holes (not shown) formed at a point where the plurality of supply pipes 42, 44, and 46 is branched. A plurality of switch holes (not shown) may be formed on the rotary plate. The rotary plate rotates in phases by the flow path switching motor. If the rotary plate rotates by the flow path switching motor, wash water pumped by the wash pump 50 may be sprayed toward at least one of the plurality of spray nozzles 34, 36, and 38 as the plurality of switch holes formed on the rotary plate is disposed at a position corresponding to at least one of a plurality of connection holes.

Wash water discharged from the sump 26 through the wash pump 50 moves to the flow path switching part 40 through a pump pipe 48. The flow path switching part 40 may supply wash water, introduced from the sump 26, to at least one of the first pipe 42, the second pipe 44, and the third pipe 46.

The upper nozzle 36 may be disposed below the upper rack 30. It is preferable that the upper nozzle 36 is rotatably coupled to the second pipe 44 so that the upper nozzle 36 rotates by a repulsive force of wash water when the wash water is sprayed from the upper nozzle 36.

The top nozzle 34 is disposed at a position higher than that of the upper rack 30. The top nozzle 34 is disposed in an upper side of the tub 24. The top nozzle 34 is supplied with wash water from the third pipe 45, and sprays the wash water toward the upper rack 30 and the lower rack 32.

The water supply module 60 is configured to be supplied with water from the outside and supply the water to the sump 26. In the present embodiment, the water supply module 60 is configured to supply water through the filter module 70 to the sump 26. The drain module 62 is configured to discharge wash water stored in the sump 26 to the outside, and the drain module 62 includes a drain pipe 64 and a drain pump 66.

The filter module 70 serves to filter out foreign substances, such as food remains, contained in wash water. The filter module is dispose on a flow path through which the wash water is introduced from the tub 24 and the sump 26.

To this end, a filter mounting part 72 into which the filter module 70 is installed may be formed in the sump 26, and a filter flow path for connecting the filter mounting part 72 and the sump 26 may be disposed in the sump 26.

The dishwasher 10 according to the present embodiment may include a water level sensing part which senses the level of water in the tub 24. The water level sensing part according to the present embodiment may include a floater (not shown) which detects the level of water in the tub 24, and a water level sensor (not shown) which senses a height of the floater to sense a water level.

The dishwasher 10 according to the present embodiment may further include: an input unit (not shown) which receives a command from a user; and a display unit (not shown) which displays a progress status of the dishwasher 10 or a notification to a user. The input unit may utilizes a touch input or a button input, and the display unit may use a display, a warning lamp, or the like.

Figure 2:
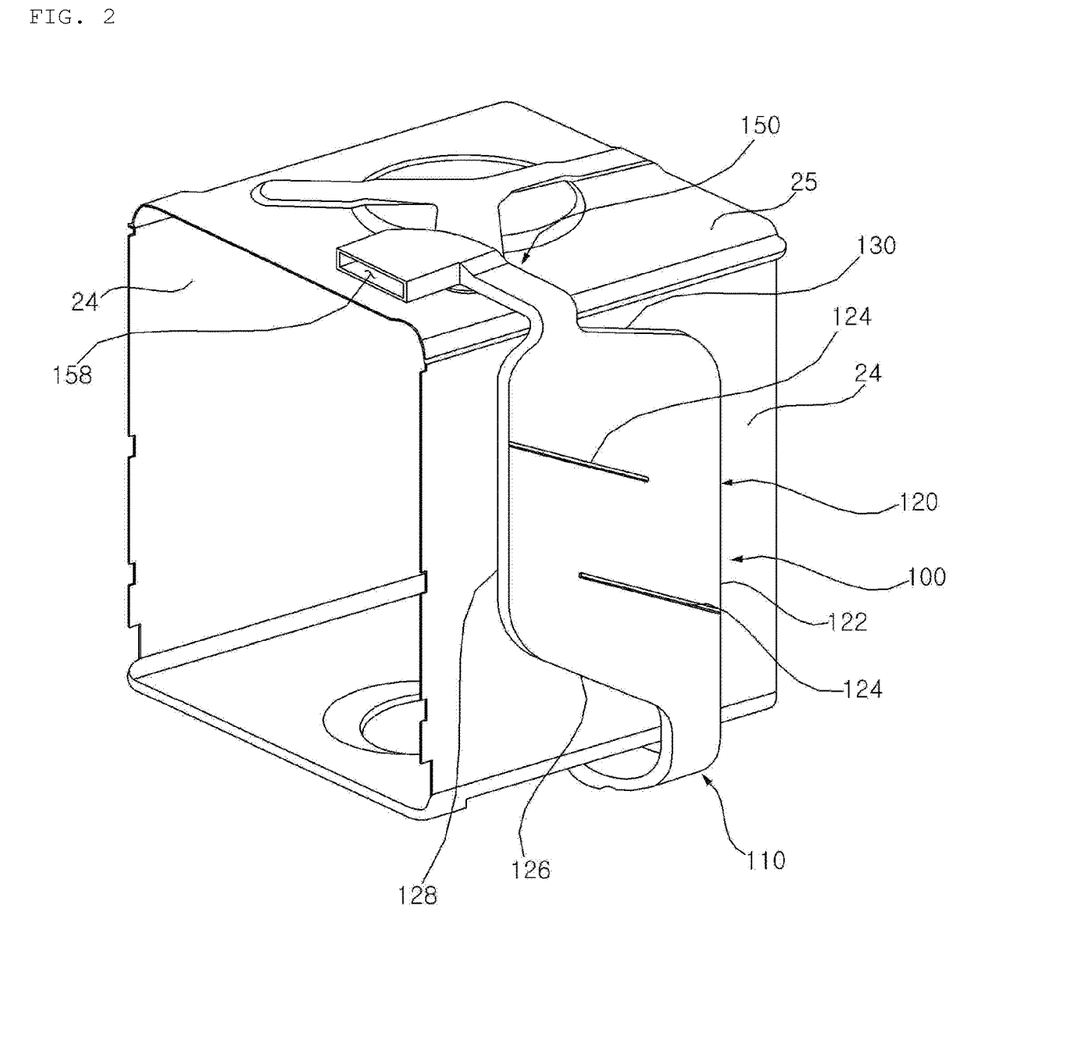
FIG. 2 is a diagram for explanation of arrangement of a tub and an external air flow unit according to an embodiment of the present disclosure.
Figure 3:
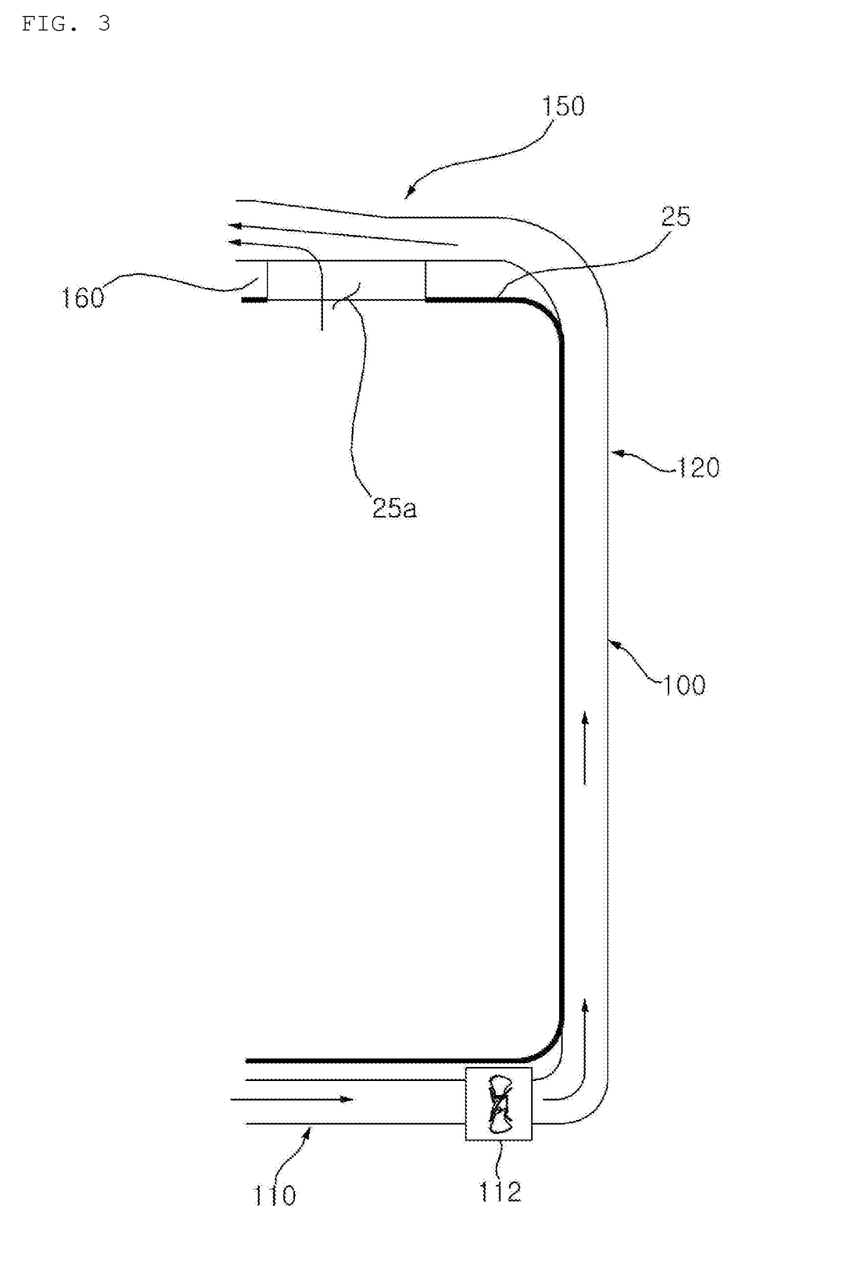
FIG. 3 is a diagram for explanation of airflow in a tub and an external air flow unit and a heat exchange relation therebetween according to an embodiment of the present disclosure.
Figure 4:
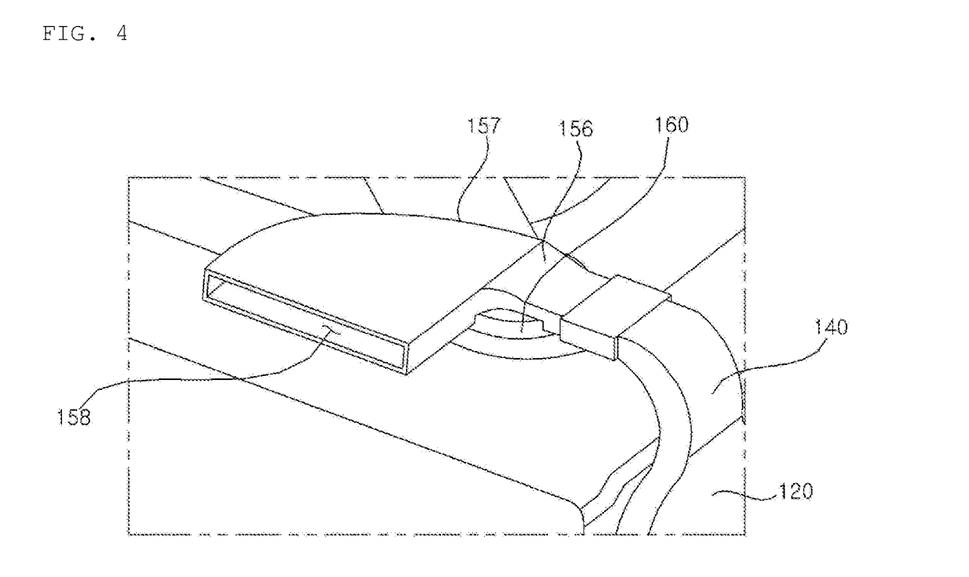
FIG. 4 is a diagram illustrating arrangement of a tub and an external air discharge part disposed on an upper side of the tub according to an embodiment of the present disclosure.
Figure 5:
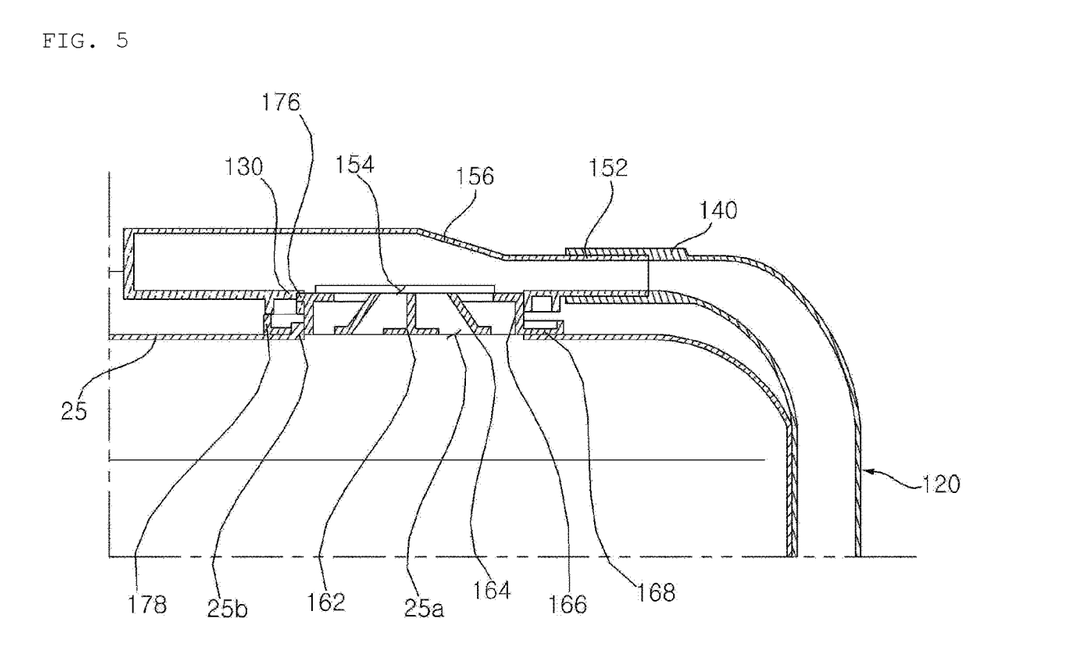
FIG. 5 is a cross-sectional view showing connection of a tub, a cap, and an external air discharge part according to an embodiment of the present disclosure.
Figure 6:
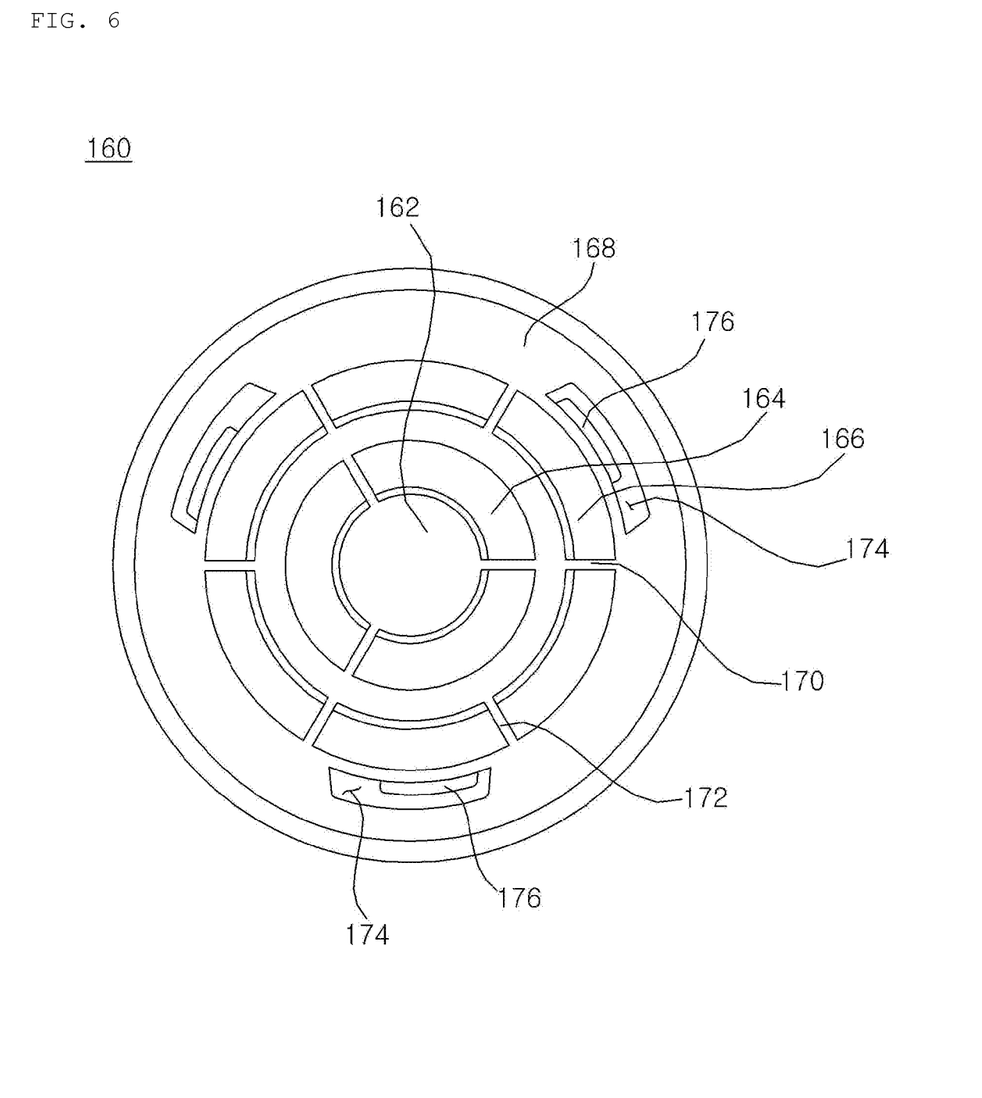
FIG. 6 is a perspective view of a cap according to an embodiment of the present disclosure.
Figure 7:
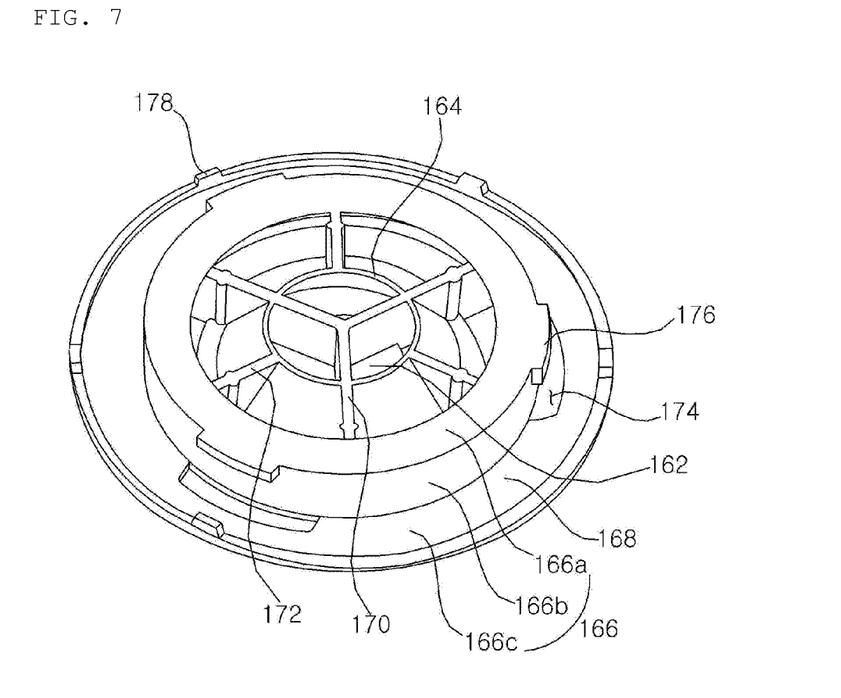
FIG. 7 is a bottom view of a cap according to an embodiment of the present disclosure.
Figure 8:
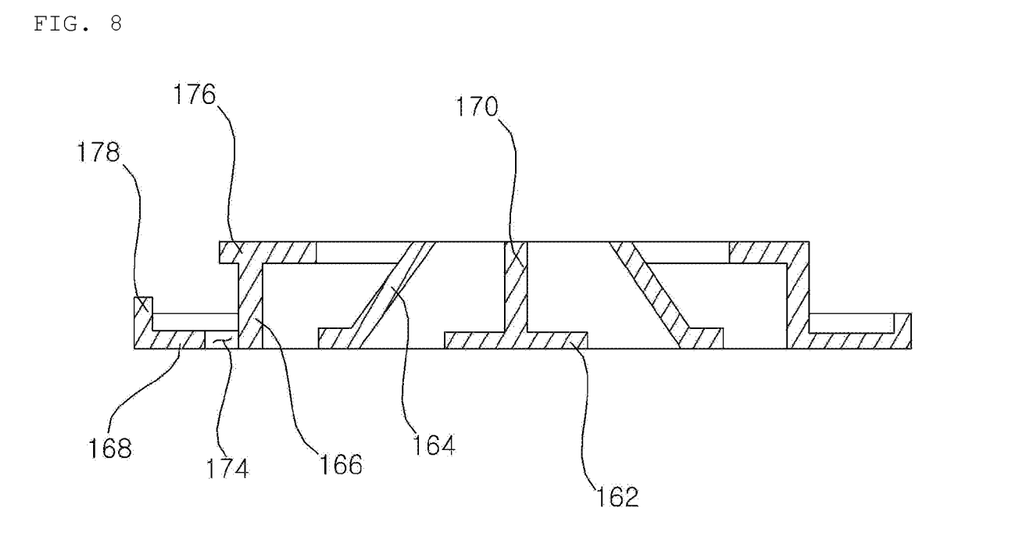
FIG. 8 is a cut-away view of a cap according to an embodiment of the present disclosure.

FIG. 2 is a diagram for explanation of arrangement of a tub and an external air flow unit according to an embodiment of the present disclosure. FIG. 3 is a diagram for explanation of airflow in a tub and an external air flow unit and a heat exchange relation therebetween according to an embodiment of the present disclosure. FIG. 4 is a diagram illustrating arrangement of a tub and an external air discharge part disposed on an upper side of the tub according to an embodiment of the present disclosure. FIG. 5 is a cross-sectional view showing connection of a tub, a cap, and an external air discharge part according to an embodiment of the present disclosure. FIG. 6 is a perspective view of a cap according to an embodiment of the present disclosure. FIG. 7 is a bottom view of a cap according to an embodiment of the present disclosure. FIG. 8 is a cut-away view of a cap according to an embodiment of the present disclosure.

Hereinafter, the structure of a dishwasher including a circulator and a heat exchanger according to the present embodiment will be described with reference to FIGS. 2 to 8.

<Brief Description about Configuration of External Air Flow Unit>

The dishwasher 10 according to the present embodiment includes an external air flow unit 100 forming a flow path, along which external air is introduced and discharged, and having an inflow hole 154 formed above the exhaust hole 25*a* of the tub 24 to communicate with the tub 24. The external air flow unit 100 according to the present embodiment may take a shape in which a cross-sectional area of the flow path decreases in an upstream side of the inflow hole 154 in a flow direction of external air and increases in a downstream side of the inflow hole 154.

The external air flow unit 100 according to the present embodiment includes: an external air inflow part 110 disposed below the tub 24 and having a flow fan 112 disposed therein to operate to introduce external air; a heat exchanger 120 communicating with the external air inflow unit 110 and disposed in surface contact with a side surface of the tub 24; and an external air discharge part 150 communicating with the heat exchanger 120 and disposed on an upper side of the tub 24 to mix air introduced from the heat exchanger 120 and internal air of the tub 24 and discharge the mixed air to an outside.

The external air flow unit 100 may have a shape of a venturi tube in which a cross-sectional area of a flow path decreases and then increases again. The venturi tube-shaped portion of the external air flow unit 100 may be formed from a discharge end portion of the heat exchanger 120 to the external air discharge part 150.

<External Air Inflow Part>

The external air inflow part 110 according to the present embodiment may be disposed below the tub 24. The external air inflow part 110 according to the present embodiment introduces external air of the cabinet 20. An inflow fan 112 for enabling air in the external air flow unit 100 to flow is disposed in the external air inflow part 110. The flow fan 112 according to the present embodiment suctions external air of the cabinet 20 into the external air inflow part 110 and delivers the suctioned air to the heat exchanger 120.

<Heat Exchanger>

The heat exchanger 120 according to the present embodiment is disposed in surface contact with one side surface of the tub 24. The heat exchanger 120 according to the present embodiment is connected to the external air inflow part 110 in a lower side, and connected to the external air discharge part 150 in an upper side. The heat exchanger 120 according to the present embodiment may include a heat exchange chamber 122 disposed on a side surface of the tub 24 and in surface contact with the tub 24 in a wide area of a plate shape.

The heat exchange chamber 122 may be disposed in surface contact with a side surface of the tub 24. Air flowing in the heat exchanger 122 may exchange heat with air flowing in the tub 24. Within the side surface of the tub 24 in surface contact with the heat exchanger 122, humid air flowing in the tub 24 may exchange heat with air flowing in the heat exchange chamber 122 to be condensed. Thus, condensed water may be created in an inner side surface of the tub 24 disposed on one side of the heat exchange chamber 122. The creation of the condensed water enhances the performance of drying the inner space of the tub 24.

In the heat exchange chamber 122 according to an embodiment of the present disclosure, there may be formed a flow path guide 124 that can increase a flow area of air flowing in the heat exchange chamber 122. The flow path guide 124 increases a length of a flow path formed in the heat exchange chamber 122, thereby increasing a heat exchange area between the heat exchanger 120 and the tub 24.

Air flows from a lower side to an upper side in the heat exchanger 120 according to the present embodiment. The heat exchanger 120 includes: an expanding tubular portion 126 in which a cross-sectional area of a flow path is increased, a maintaining tubular portion 128 which is disposed above the extension 126, and which maintains the increased cross-sectional area of the flow path; and a narrowing tubular portion which is disposed above the maintaining tubular portion 128, and in which the cross-sectional area of the flow path is decreased.

The expanding tubular portion 126 is connected to the external air inflow part 110 in the lower side. Air introduced into the heat exchanger 120 through the external air inflow part 110 is pressed while passing through the expanding tubular portion 126, thereby slowing down a flow rate. The flow fan according to the present embodiment may be disposed in the external air inflow part 110 to be adjacent to the expanding tubular portion 126, thereby increasing a flow rate of air introduced into the heat exchanger 120.

The air having passed through the expanding tubular portion 126 may exchange heat with the tub 24 in a wide area while passing through the maintaining tubular portion 128. The maintaining tubular portion 128 may occupy most of the area of the heat exchanger 120. In the maintaining tubular portion 128, there may be formed a flow path guide that extends a length of a flow path along which air flows.

The narrowing tubular portion 120 is disposed above the maintaining tubular portion 128 and connected to the external air discharge part 150 disposed on the upper side of the tub 24. The narrowing tubular portion 130 takes the shape in which a cross-sectional area of a flow path, maintained in the maintaining tubular path 128, is decreased dramatically.

As the cross-sectional area of the flow path of the narrowing tubular portion 130 is decreased, pressure of air flowing in the narrowing tubular portion 130 decreases, thereby increasing a flow rate. As the cross-sectional area of the flow path is decreased, negative pressure may be formed for the air flowing in an end of the narrowing tubular portion 130 connected to the external air discharge part 150. Thus, at a portion where air flows to the external air discharge part 150, internal air of the tub 24 may flow into the external air discharge part 150.

The external air flow unit 100 according to the present embodiment may further include a connecting pipe that connects the heat exchanger 120 disposed on a side surface of the tub 24 and the external air discharge part 150 disposed on the upper side of the tub 24. The connecting pipe 140 may have a shape that is bent along an upper edge of the tub 24. The connecting pipe 140 may maintain the size of a cross-sectional area of a flow path, which has been decreased in the narrowing tubular portion 130.

The connecting pipe 140 according to the present embodiment is connected to the external air discharge part 150 on the upper side of the tub 24. Referring to FIG. 5, the connecting pipe 140 according to the present embodiment is integrally formed with the heat exchanger 120 and provided separately from the external air discharge part 150 such that the connecting pipe 140 coupled to the external air discharge part 150. However, this is merely an embodiment, and the connecting pipe 140 may be integrally formed with the external air discharge part 150.

The connecting pipe 140 according to the present embodiment may maintain the cross-sectional area decreased in the narrowing tubular portion 130, or may have a cross-sectional area smaller than the decreased cross-sectional area. Thus, air flowing in the connecting pipe 140 still flow with low pressure at a high flow rate.

<External Air Discharge Part>

The external air discharge part 150 according to the present embodiment discharges air introduced from the heat exchanger 120 to an outside. The external air discharge part 150 according to the present embodiment may mix hot humid air in the tub 24 and low dry air flowing in the external air flow unit 100 to discharge air of low temperature and low humidity to the outside.

In one side of a lower surface of the external air discharge part 150 according to the present embodiment, there is formed an inflow hole 154 through which internal air of the tub 24 is introduced. The inflow hole 154 is formed above the exhaust hole 25a formed on an upper surface of the tub 24. The external air discharge unit 150 according to the present embodiment includes an external air discharge part-connecting pipe 140 connected to the connecting pipe 140. The external air discharge part-connecting pipe 140 may be coupled to the connecting pipe 140 in a manner in which the external air discharge part-connecting pipe 140 is inserted into the connecting pipe 140.

The external air discharge part 150 includes an external air discharge part-expanding tubular portion 156 in which an area of a flow path expands in downstream of the inflow hole 154. In the external air discharge part-expanding tubular portion 156, a flow path may expand in an upward direction and both side directions.

The external air discharge part-expanding tubular portion 156 according to the present embodiment may be formed at a portion where the inflow hole 154 is formed. Thus, in the external air discharge part 150 according to the present embodiment, an area of a flow path may increase at the portion where the inflow hole 154 is formed.

Humid air in the tub 24 flows into the external air discharge part 150 through the exhaust hole 25a of the tub 24, and is pressed while passing through the external air discharge part-expanding tubular portion 156 to be thereby mixed with external air flowing in the external air discharge part 150. Thus, the mixed air may be discharged in a low-temperature and low-humidity state to the outside of the dishwasher 10

The external air discharge part 150 according to the present embodiment may further include a curved portion 157 that is curved such that air flowing in the external air discharge part 150 extending in a lateral direction is discharged forward of the dishwasher 10. The external air discharge part 150 according to the present embodiment may extend in a direction forward of the dishwasher 10, while passing through the curved portion 157. The curved portion 157 according to the present embodiment expands a flow path area of the external air discharge part 150. Referring to FIG. 4, a flow path area formed forward expands while passing through the curved portion 157 of the external air discharge part 150. Thus, air flowing in the external air discharge part 150 may be pressed while passing through the curved portion 157, thereby slowing down a flow rate. In the external air discharge part 150 according to the present embodiment, the discharge hole 158 is formed forward of the dishwasher 10.

Air flowing in the external air discharge part 150 according to the present embodiment forms negative pressure in the upper side of the inflow hole 154, so that internal air of the tub 24 is introduced. Accordingly, hot and humid air in the tub 24 may be mixed with dry air of low temperature flowing in the external air flow unit 100, so that air of low temperature and low humidity may be discharged to the outside of the cabinet 20.

<Cap>

A cap 160 according to the present embodiment connects the tub 24 and the external air discharge part 150. The cap 150 according to the present embodiment enables the exhaust hole 25a formed in the tub 24 and the inflow hole 154 formed in the external air discharge part 150 to communicate with each other. The cap 160 according to the present embodiment is coupled to the upper side of the tub 24.

In the cap 160 according to the present embodiment, a fixing hole 174 for fixing the cap 160 to the tub 24 may be formed. At a portion where the cap 160 is fixed to the tub 24, a fixing protrusion 25b corresponding to the fixing hole 174 may be formed. The cap 160 may be coupled to the upper side of the tub 24 by the fixing hole 174 and the fixing protrusion 25b.

In the cap 160 according to the present embodiment, a coupling protrusion 176 to be coupled to the inflow hole 154 of the external air discharge part 150 may be formed. At a portion where the external air discharge part 150 is coupled to the cap 160, a coupling groove (not shown) corresponding to the coupling protrusion 176 may be formed.

The cap 160 according to the present embodiment has a plate shape which is approximately circular, and the inside of the cap 160 is opened vertically. The cap 160 according to the present embodiment may include a plurality of covers 162, 164, and 166 so that wash water sprayed from the tub 24 is prevented from flowing to the external air discharge part 150 through the exhaust hole 25a. The plurality of covers 162, 164, and 166 may cover wash water sprayed from the tub 24 toward the external air discharge part 150, while disturbing a flow of air.

The cap 160 according to the present embodiment includes: a first cover 162 formed at the center and covering wash water sprayed from the tub 24; a second cover 164 formed on an outer circumference of the first cover 162 to be inclined; and a third cover 166 disposed on an outer circumference of the second cover 164 and forming an outer circumferential surface of the cap 160. In the cap 160 according to the present embodiment, connection ribs 170 and 172 connecting the first cover 162, the second cover 164, and the third cover 166 mat be formed.

The first cover 162 according to the present embodiment is disposed under the center of the cap 160. Referring to FIGS. 6 and 7, the first cover 162 according to the present embodiment has a circular plate shape. A first connecting rib 170, which will be described later, is disposed on an upper side of the first cover 162 according to the present embodiment.

The second cover 164 according to the present embodiment is disposed on the outer circumference of the first cover 162. The second cover 164 may be spaced apart from the outer circumference of the first cover 162. The second cover 164 according to the present embodiment may take the shape of circular truncated cone which is opened vertically. An inner diameter of the second cover 164 according to the present embodiment may be greater than an outer diameter of the first cover 162. Referring to FIGS. 6 and 7, the second cover 164 according to the second embodiment may take the shape of a circular truncated cone which extends upward toward the center of the cap 160. Between the second cover 164 and the first connecting rib 170 disposed on the upper side of the first cover 162, an air passage is formed.

The third cover 166 according to the present embodiment is disposed on an outer circumference of the second cover 164. The third cover 166 may be spaced apart from the outer circumference of the second cover 164. The third cover 166 according to the present embodiment may form an outer circumference of the cap 160 and connect the external air discharge part 150 and the tub 24.

The third cover 166 according to the present embodiment may include a seating portion 166c in contact with the upper surface of the tub 24; a circumferential surface portion 166b extending upward from an inner end of the seating portion 166c; and an upper cover portion 166a extending inward from an upper end of the circumferential surface portion 166b. The circumferential surface portion 166b connects the seating portion 166c and the upper cover portion 166a. The circumferential surface portion 166b according to the present embodiment may vertically connect the inner end of the seating portion 166c and an outer end of the upper cover portion 166a.

The third cover 166 according to the present embodiment includes: a fixing groove 174 formed on one side of the seating portion 166c and connected to the upper surface 25 of the tub 24; and a coupling protrusion 176 formed on an upper side of the circumferential surface portion 166b and protruding in a direction distal from the center of the cap 160.

An outer edge of the seating portion 166c according to the present embodiment may protrude upward, and protrusions 178 protruding upward may be formed on the edge of the seating portion at a predetermined interval.

The connecting rib 170 and 172 according to the present embodiment radially extends from the center of the cap 160, and connect the first cover 162, the second cover 164, and the third cover 166. The connecting rib 170 and 172 according to the present embodiment may connect the first cover 162, the second cover 164, and the third cover 166 individually or as a whole. The connecting rib 170 and 172 according to the present embodiment radially extends from the center of the cap 160 to reinforce the rigidity of the cap 160.

Referring to FIGS. 6 and 7, the connecting rib 170 and 172 according to the present embodiment may include: a first connecting rib 170 connecting the first cover 162, the second cover 164, and the third cover 166; and a second connecting rib 172 connecting the second cover 164 and the third cover 166.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternatives uses will also be apparent to those skilled in the art.

What is claimed is:

1. A dishwasher comprising:
    a cabinet that defines an external appearance of the dishwasher;
    a tub that is located in the cabinet and that defines a wash space configured to receive one or more objects to be washed, the tub defining an exhaust hole at an upper surface of the tub;
    an external air flow unit that defines a flow path configured to introduce external air into a space between the tub and the cabinet and to discharge the external air to an outside of the tub, the external air flow unit defining an inflow hole located vertically above the exhaust hole and configured to communicate with the tub; and
    a cap that connects the tub and the external air flow unit, that is located between the exhaust hole and the inflow hole, and that is configured to block wash water sprayed from the tub,
    wherein the external air flow unit is configured to guide external air from a downstream side of the inflow hole to an upstream side of the inflow hole,
    wherein a cross-sectional area of the flow path decreases from the upstream side to the inflow hole and increases from the inflow hole to the downstream side, and
    wherein the cap comprises:
        a first cover located vertically below a center of the cap, the first cover having a circular plate shape,
        a second cover that is located at a circumference of the first cover and that extends upward, the second cover having an inclined surface that is inclined toward the center of the cap, and
        a third cover that is located at a circumference of the second cover and that extends upward, the third cover having a bent surface that is bent toward the center of the cap.

2. The dishwasher of claim 1, wherein the external air flow unit further comprises:
    an external air inflow part located vertically below the tub, the external air inflow part comprising a flow fan configured to introduce external air to the external air flow unit;
    a heat exchanger that communicates with the external air inflow part and that is in surface contact with a side surface of the tub; and
    an external air discharge part that communicates with the heat exchanger, that is located at the upper surface of the tub, and that is configured to (i) allow the external air from the heat exchanger to be mixed with internal air from the tub and (ii) discharge the mixed air to the outside of the tub.

3. The dishwasher of claim 2, wherein the external air discharge part comprises an inflow end configured to receive the external air from the heat exchanger,
    wherein the heat exchanger comprises a discharge end portion that faces the inflow end of the external air discharge part and that defines a first cross-sectional area of the flow path, and
    wherein the flow path extends, based on maintaining the first cross-sectional area, from the inflow end of the external air discharge part to the inflow hole of the external air flow unit.

4. The dishwasher of claim 3, wherein the tub defines a front opening that is open in a forward direction, and
    wherein the external air discharge part defines a discharge hole configured to discharge the mixed air in the forward direction.

5. The dishwasher of claim 2, wherein the heat exchanger comprises:

an expanding tubular portion that is located at a lower side of the tub, the cross-sectional area of the flow path increasing from a first to a second size in the expanding tubular portion;

a maintaining tubular portion that is located vertically above the expanding tubular portion, the cross-sectional area of the flow path having the second size in the maintaining tubular portion; and a narrowing tubular portion that is located vertically above the maintaining tubular portion, the cross-sectional area of the flow path decreasing from the second size to a third size in the narrowing tubular portion, and wherein the external air discharge part comprises an inflow end that faces the narrow tubular portion, the cross-sectional area of the flow path having the third size at the inflow end.

6. The dishwasher of claim 5, wherein the external air flow unit further comprises a connecting tube that connects the heat exchanger to the external air discharge part, and wherein the connecting tube maintains the cross-sectional area of the flow path to be the second size.

7. The dishwasher of claim 5, wherein the third size of the cross-sectional area of the flow path is less than the first size of the cross-sectional area of the flow path.

8. The dishwasher of claim 2, wherein the heat exchanger comprises:

a heat exchange chamber that is in surface contact with the side surface of the tub and that defines a space configured to allow air to flow in the heat exchanger; and a flow path guide located in the heat exchange chamber and configured to guide flow of air in the heat exchange chamber.

9. The dishwasher of claim 8, wherein the flow path guide extends from an inner surface of the heat exchange chamber in a direction inclined with respect to a bottom surface of the tub.

10. The dishwasher of claim 1, wherein the cap is further configured to guide air exhausted from the tub toward the inflow hole of the external air flow unit.

11. The dishwasher of claim 1, wherein the cap further comprises a connecting rib that radially extends from the center of the cap and that connects the first cover, the second cover, and the third cover to one another.

12. The dishwasher of claim 11, wherein the connecting rib extends upward from an upper surface of the first cover, and wherein an upper surface of the connecting rib is coplanar with upper surfaces of the second cover and the third cover.

13. The dishwasher of claim 1, wherein the second cover is located radially outward of the first cover, and the third cover is located radially outward of the second cover.

14. The dishwasher of claim 13, wherein the second cover and the first cover are spaced apart from each other in a radial direction and define a first outlet configured to guide at least a portion of air exhausted from the tub toward the inflow hole of the external air flow unit, and wherein the third cover and the second cover are spaced apart from each other in the radial direction and define a second outlet configured to guide at least a portion of air exhausted from the tub toward the inflow hole of the external air flow unit.

15. The dishwasher of claim 1, wherein the cabinet and the tub are spaced apart from each other and define a space that accommodates the external air flow unit between an inner surface of the cabinet and an outer surface of the tub.

16. The dishwasher of claim 1, wherein the external air flow unit is configured to, based on guiding external air to pass an upper portion of the exhaust hole, suction internal air from the tub through the exhaust hole.

17. The dishwasher of claim 1, wherein the external air flow unit extends from a bottom surface of the tub to a top surface of the tub, and contacts an outside surface of the tub, and wherein the external air flow unit is configure to, based on contacting the outside surface of the tub, cause condensation of internal air at an inside surface of the tub opposite to the outside surface of the tub.

18. The dishwasher of claim 4, wherein a width of the discharge hole is greater than a width of the inflow end of the external air discharge part.

19. The dishwasher of claim 1, wherein the external air flow unit is configured to discharge, to the outside of the tub, at least one of the external air guided through the flow path or internal air discharged from the tub, either or both, through the inflow hole.

20. The dishwasher of claim 1, further comprising a door disposed at a front side of the cabinet and configured to open and close a front opening defined in the front side of the cabinet, and wherein the external air flow unit is spaced apart from the door and disposed between a lateral side surface of the cabinet and a lateral side surface of the tub.

\* \* \* \* \*